United States Patent [19]

Hedrick et al.

[11] E Re. 28,646

[45] Reissued Dec. 9, 1975

[54] REINFORCED POLYAMIDES AND PROCESS OF PREPARATION THEREOF

[75] Inventors: Ross Melvin Hedrick, Creve Coeur; William R. Richard, Jr., St. Louis, both of Mo.

[73] Assignee: Monsanto Company, St. Louis, Mo.

[22] Filed: June 20, 1973

[21] Appl. No.: 372,880

Related U.S. Patent Documents

Reissue of:

[64] Patent No.: 3,419,517
Issued: Dec. 31, 1968
Appl. No.: 560,247
Filed: June 24, 1966

U.S. Applications:

[63] Continuation of Ser. No. 154,451, June 18, 1971, abandoned.

[52] U.S. Cl. ..... 260/37 N; 260/78 L

[51] Int. Cl.[2] ..... C08L 77/02

[58] Field of Search ..... 260/37 N, 448.2 B

[56] References Cited

UNITED STATES PATENTS

| | | | |
|---|---|---|---|
| 2,852,485 | 9/1958 | Stott | 260/37 |
| 3,164,563 | 1/1965 | Maxwell | 260/37 |
| 3,228,759 | 1/1966 | Small | 260/37 N X |
| 3,251,799 | 4/1966 | Pietrusza | 260/37 |
| 3,290,165 | 12/1966 | Iannicelli | 106/308 |

FOREIGN PATENTS OR APPLICATIONS

| | | |
|---|---|---|
| 6,406,095 | 12/1964 | Netherlands |

OTHER PUBLICATIONS

Anonymous: Plastics Technology, Feb. 1965, pp. 42–44.

T. P. Murphy: A.C.S., Div. of Org. Coating and Plastics Chem., papers presented at Atlantic City Meeting, Sept. 1965, 25(2), pp. 76, 77, 79, 83, 85, 89, 90.

J. S. Marsden and S. Sterman: A.C.S. Div. or Org. Coating and Plastics Chem., papers presented at Atlantic City meeting, Sept. 1965, 25 (2); pp. 91, 97–100.

*Primary Examiner*—Lewis T. Jacobs

EXEMPLARY CLAIM

1. A reinforced polymeric composition comprising a polyamide and at least about 25% by volume of an inorganic filler material having a length to diameter ratio of up to about 25 to 1, said material having been treated with an organosilane coupling agent of the formula $$X_a-\overset{\overset{\displaystyle Y_b}{|}}{Si}-[R_n-Z]_c$$

where X is a hydrolyzable group capable of reaction with a hydroxyl group, Y is hydrogen or a monovalent hydrocarbon group, R is an alkylene group having from 1 to about 20 carbon atoms, Z is a group capable of reaction with a polyamide, n is an integer from 0 to 1, a is an integer from 1 to 3, b is an integer from 0 to 2, c is an integer from 1 to 3 and the sum of $a+b+c$ equals 4.

45 Claims, No Drawings

REINFORCED POLYAMIDES AND PROCESS OF PREPARATION THEREOF

Matter enclosed in heavy brackets [ ] appears in the original patent but forms no part of this reissue specification; matter printed in italics indicates the additions made by reissue.

[ The present application is a continuation-in-part of copending U.S. application Ser. No. 284,375 filed May 31, 1963, now abandoned. ]

*This is a continuation of application Ser. No. 154,451, filed June 18, 1971, and now abandoned.*

*The present application is an application for a reissue of U.S. 3,419,517 issued on Dec. 31, 1968. U.S. 3,419,517 issued from U.S. Patent Application Ser. No. 560,247 filed on June 24, 1966 as a continuation-in-part of then copending U.S. Patent Application Ser. No. 284,375 filed May 31, 1963 and now abandoned.*

This invention relates to polyamide compositions reinforced by the inclusion therein of modified particulate materials. One feature of the invention pertains to reinforced polyamides having mechanical properties significantly improved by comparison to the properties of polyamides described in the prior art. This invention also relates to processes for preparing the polyamides referred to above. Another feature of the invention pertains to a base-catalyzed, substantially anhydrous anionic polymerization of a lactam monomer in the presence of a modified particulate material. Yet another feature of the invention is directed to a condensation polymerization of a diamine and a dicarboxylic acid in the presence of a modified particulate material.

It is well known in the prior art that polymeric compositions can be "filled" with non-polymeric substances to form a uniform finished product. Initially, various fillers were used in a polymeric material to color the polymer, change its coefficient of expansion, improve abrasion resistance, modulus, and strength, and to dilute the polymer thereby lowering its costs. It was, and is now, common practice to admix a filler and polymer in several ways to produce a dispersion of the filler in the polymer. One method has been to mix thoroughly a monomer and filler and subsequently polymerize the monomer, thereby producing a composition wherein the filler is intimately dispersed throughout the finished product. Another method has been to subject uncured polymer and filler to a shearing force thereby dispersing the filler in the polymeric matrix. Various other methods of filling polymers are also well known in the art.

However, the upper limit of filler that can be used in such mixtures without adversely affecting the mechanical properties of the product is low. The tensile and flexural strengths particularly fall off sharply at relatively low concentrations of filler. An exception to this generalization has been the use of fibrous material, particularly fibrous glass particles, in polymeric compositions. The incorporation of fibrous glass into a polymer increases mechanical properties significantly. As yet, such improvement has not been achieved by the use of particulate material. The reason for the decrease in strength exhibited by particulately filled polymers is that a particulate filler in a polymer is not a component comparable to a fiber in load distribution characteristics. Normally a filler acts to concentrate stresses rather than distribute them. As a result, the polymer-filler interface is the weak link in the composite. With a fibrous filler, the plurality of weak links along the fiber structure result in a reasonably strong bond when stress is applied in a direction parallel to the orientation of the fibers. When a transverse stress is applied to longitudinally oriented fibrous filler or when any stress is applied to particulate filled materials, the stress is not well distributed and the composition is weak. Therefore a filled polymeric product which contains less polymer per unit volume of the product than an unfilled polymer, oridinarily possesses mechanical properties inferior to the unfilled polymer, particularly at granular filler concentrations of about 50% or more by weight or 25% or more by volume.

The reinforcement of polyamide compositions by means of particulate as distinguished from fibrous particles is a desirable feature since a particulate inorganic-monomer mixture is more fluid, hence more easily cast or molded, than a mixture containing an equivalent amount of a fibrous material. Further, fabrication techniques are far simpler for a mixture of particulate inorganic and polymer than for a mixture of fibers and polymer.

Those skilled in the art will recognize, however, that certain of the mechanical properties of polyamides as well as other polymers have in the past been improved by the inculsion of inorganic particulate materials within the polymeric matrix. Young's modulus of elasticity for instance can be increased by filling a polyamide with a high level of particulate inorganic. The flexural and tensile strengths are compromised, however, as is the resistance to impact. For many uses, what is required is not an improvement in one mechanical property but rather an improvement in a combination of properties. Which combination of properties should be emphasized for improvement depends upon the uses envisioned for the final product. For uses such as furniture, furniture components, automobile components, equipment housings, building panels and other applications where the tensile and flexural strengths and moduli and impact strength are important factors, one value helpful in screening suitable materials from unsuitable materials is the Strength Index. The Strength Index is a property of a material which is based upon the relationship of the flexural strength to the impact strength of a material. Generally, the higher the Strength Index of a composition, the more valuable it is for several of the uses mentioned above.

It a particulately filled polyamide could be fabricated with a Strength Index high enough to permit its use in several applications heretofore unsuitable for polyamides, the development would certainly represent a valuable and unobvious advance in the art. Providing such a particulately filled, highly reinforced polyamide constitutes a principal object of this invention. Another object is the provision of a method for preparing polyamides with an unusually high Strength Index and rigidity. Additional objects, benefits and advantages will become apparent in view of the following detailed description.

The polymeric compositions of this invention comprise a polyamide, and at least 25% by volume of an inorganinc filler material having a length to diameter ratio of up to 25 to 1, said material having been treated with an organo-silane coupling agent of the formula $$X_n-\overset{\overset{\displaystyle Y_b}{|}}{Si}[R_n-Z]_c$$

where X is a hydrolyzable group capable of reaction with a hydroxyl group, Y is hydrogen or a monovalent hydrocarbon group, R is an alkylene group having from about 1 to about 20 carbon atoms, Z is a group capable f reaction with a polyamide, n is an integer from 0 to , a is an integer from 1 to 3, b is an integer from 0 to , c is an integer from 1 to 3 and the sum of a + b + c nd equals 4.

POLYMER

Polyamides useful in the compositions of this inven- on include two broad categories. One category in- ludes the polylactams produced by the polymerization f lactam monomers of the formula

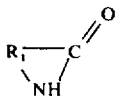

here $R_1$ is an alkylene group having from 3 to 12 or ıore carbon atoms, preferably from 5 to 12 carbon :oms. A preferred monomer is $\epsilon$-caprolactam. Lac- ım monomers in addition to $\epsilon$-caprolactam include -pyrrolidone, piperidone, valerolactam, caprolactams ther than the $\epsilon$-isomer, methyl cyclohexanone isox- ners, capryllactam, cyclodecanone isoxime, lauryllac- ım, etc. A specific polyamide to which this invention applicable is polycaprolactam, commonly known as ylon 6. Also included are copolymers of two or more f the above or similar lactam monomers as well as co- olymers containing more than 50% lactam and a naller quantity of other monomers polymerizable by n anionic, base-catalyzed mechanism. Examples in- lude copolymers of caprolactam with capryllactam, opolymers of caprolactam with lauryllactam and co- olymers of pyrrolidone with piperidone or caprolac- ım as well as copolymers of a lactam with a bislactam aving a formula such as the following:

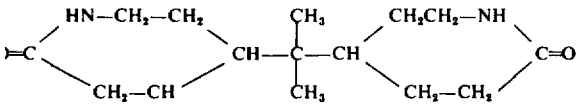

he second category of polyamides comprises those olymers formed by the condensation polymerization f dicarboxylic acids with diamines, one of the most gnificant polymers being polyhexamethylene adipa- ıide (nylon 6,6). Other related polyamides include ıose formed from polyamines such as propanedia- ıine, hexamethylenediamine and octamethylenedia- ıine and polycarboxylic acids such as adipic acid, pi- ıelic acid, suberic acid, sebacic acid and dodecanedi- ic acid. Also included are copolymers or polyblends of olyamides of the two above categories. The copoly- ıers or polyblends can consist of mixture of the two ›rms of polyamides with each other or with other com- atible resin systems. The copolymers or polyblends of ıis invention are limited to those containing at least 0% by weight polyamide. Most of the preferred com- ositions will contain at least 90% by weight polyamide ı the resin phase. Examples of resins which can be ıixed with polyamides to form a blend or copolymer ıclude polypropylene, polyethylene, polystyrene, olyacrylonitrile, polybutadiene, acrylonitrile-contain- ıg rubbers, styrene-acrylonitrile copolymer and poly- henylene oxide.

The polyamides may be linear or crosslinked. A rosslinked polyamide provides some improvement in ıechanical properties, particularly impact strength, but linear polyamides are also definitely included within the scope of the invention. The maximum amount of tolerable crosslinking in the polymer depends upon the proposed use of the finished composition. Moderate crosslinking produces compositions with high impact resistance and somewhat diminished flexural strength and modulus. Consequently, control of crosslinking provides a variable which enables one to "tailor" the polyamide in many respects to produce a composition of the desired properties. Suitable crosslinking agents are well known in the art and can be used here in the conventional manner. Two compounds which we have used include polyethyleneimine and tetra-(3-aminopropoxymethyl)methane. In addition, crosslinking can be achieved through the coupler by hydrolysis of silanol groups to form siloxane linkages, i.e.

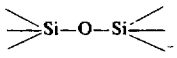

by the use of polyfunctional promoters in a lactam polymerization, such as di- and triisocyanates or by the inclusion of polymers such as polyisopropyl acrylamide or polymethyl methacrylate.

REINFORCING AGENTS

The term filler as used herein refers to those nonpolymerizable, discrete particles which are capable of existing and remaining in a discontinuous phase when placed in the presence of a polymer or polymerizing monomer and subjected to processing conditions necessary to shape the composite into a solid finished article.

Inorganic filler materials useful herein can be selected from a wide variety of minerals, metal oxides, metal salts such as metal aluminates and metal silicates, other siliceous materials and mixtures thereof. The term reinforcing agent is used to designate filler materials which have been treated with a coupling agent to provide a capability for adherent bonding of filler to polyamide. To function as effective reinforcing agents under conditions of high moisture, it is imperative that the filler materials be at most sparingly soluble in water, not exceeding a solubility of about 0.15 gram per liter. If, however, the finished composition is to be used in an application where moisture sensitivity is not a problem, more soluble filler materials can be used. Generally, those hard, high modulus materials which have or can acquire an alkaline surface upon treatment with a base are well suited for our reinforced polymeric compositions. By high modulus is meant a Young's modulus of elasticity at least twice as great as that of the base polyamide. More preferably, suitable inorganic fillers will have a Young's modulus of $10^7$ p.s.i. or greater. Many inorganics fulfill both preferred characteristics of high modulus and alkaline surface and therefore constitute one class of preferred filler materials. Since metal silicates and siliceous materials usually have or can readily acquire the desired alkaline surface, and since they are characterized by modulus values well above the preferred minimum, a preferred mixture is one which contains a major amount, i.e. more than 50% by weight of metal silicates or siliceous materials.

Materials with such characteristics are preferred because of the ease with which they are coupled to the polymer. However, other substances such as alumina, $Al_2O_3$, which are not easily coupled to a polyamide by means of coupling agents employed herein, can nevertheless be used as a reinforcing component either singly or preferably combined with other minerals which are more susceptible to coupling, and more preferably combined in minor amounts, i.e. percentages of less than 50% of the total reinforcing material. An example of such a material useful in the production of a reinforcing agent, with which alumina can be mixed, is feldspar. Feldspar can be converted into one of the preferred reinforcing agents of this invention and a feldspar-alumina mixture is also useful. Other materials particularly preferred for conversion into reinforcing agents include wollastonite, which is a calcium metasilicate; mullite, an aluminum silicate; calcium magnesium silicates; and an acicular aluminum silicate, $Al_2SiO_5$. Other useful inorganics which can be converted into reinforcing agents include quartz and other forms of silica such as silica gel, carbon black, graphite, cristobalite, calcium carbonate, etc; metals such as aluminum, tin, lead, magnesium, calcium, strontium, barium, titanium, zirconium, vanadium, chromium, manganese, iron, cobalt, nickel, copper and zinc; metal oxides in general such as oxides of aluminum, tin, lead, magnesium, calcium, strontium, barium, titanium, zirconium, vanadium, chromium, manganese, iron, cobalt, nickel, copper, and zinc; heavy metal phosphates, sulfides, and sulfates, and basic mineral and mineral salts such as spodumene, mica, montmorillonite, kaolinite, bentonite, hectorite. beidellite, attapulgite, chrysolite, garnet, saponite and hercynite.

The term inorganic filler material or simply inorganic used in this disclosure refers to materials such as exemplified above. It should be noted that carbon black and graphite have been listed as suitable inorganic fillers. The term inorganic, in addition to conventional inorganic materials, also includes those carbon-containing materials characterized by the substantial absence of carbon-hydrogen bonds, i.e. less than 1.5% by weight hydrogen. Particularly preferred are those inorganic siliceous materials which have a 3-dimensional crystal structure as opposed to a 2-dimensional or planar crystal configuration. These siliceous materials are also characterized by a somewhat refractory nature with a melting point above about 800°C, a Mohs' hardness of at least 4, and a water solubility of less than 0.1 gram per liter. Examples of preferred siliceous materials include minerals such as feldspar, quartz, wollastonite, mullite, kyanite, chrysolite, cristobalite, crocidolite, acicular aluminum silicate having the formula $Al_2SiO_5$, spodumene and garnet. These minerals are especially desirable for use in reinforced polyamide compositions for a number of reasons. For instance, they provide a composition with better abrasion resistance, flexural strength and modulus, tensile strength and modulus, impact resistance, resistance to heat distortion and resistance to thermal expansion than do conventional clay fillers and inorganic pigments such as whiting. Further, the minerals described above provide higher loading levels than can be achieved with glass fibers, an important economic consideration. In addition, highly loaded lactam monomer slurries can be directly cast into a final polymerized form, thereby eliminating several processing steps necessary with glass fiber-reinforced compositions.

Metals have been suggested above as suitable reinforcing agents. In addition to providing high strength, reinforced polymeric compositions, the use of certain metals such as copper, silver, iron and others can provide certain important auxiliary advantages. Moderate to high concentrations of metals can make the polymeric composite electrically conductive, thereby rendering the composite suitable for an electroplating operation wherein the composite can be electroplated with a thin coat of a metal such as chromium, silver, gold, etc. Or the use of iron or steel as a reinforcing agent can give the polymeric composite magnetic properties if the particles are oriented within the composition.

Inorganic filler materials useful herein are referred to as particulate. The term particulate as used in this disclosure refers to granular, plate-like and acicular particles having a length to diameter ratio (l/d) up to about 25 to 1. Preferably, the inorganics useful herein have an l/d ratio up to about 20 to 1, and more preferably from about 1 to 1 up to about 15 to 1. In contrast, the term fibrous refers to particles whose l/d ratios are greater than 25 to 1, and usually are greater than 50 to 1.

It is pointed out that plate-like particles, which can be considered as rods compressed in a direction parallel to their longitudinal axes, are considered herein to have l/d ratios of less than 1 to 1. The plate-like fillers such as bentonite, kaolinite, talc and mica perform quite satisfactorily when treated with a silane coupler and mixed with a preformed polyamide as described subsequently herein. Plate-like reinforcing agents also perform satisfactorily when placed in the presence of diamine-dicarboxylic acid salts which are subsequently polymerized to form a polyamide. The use of plate-like reinforcing agents in polylactams provides only slight improvement, however, when the treated filler is placed in the presence of the lactam during polymerization. Perhaps this is due to the difficulty encountered in thoroughly drying such hydrated, high surface area minerals. Regardless of the explanation, the plate-like fillers represent under those circumstances an important exception to the general reinforcing attributes of fillers of this invention.

Several characteristics of fillers have an effect on the maximum attainable loading of the composition. When the reinforced composition is produced by casting a monomer-reinforcing agent mix directly into a mold where the monomer is polymerized, the maximum content of reinforcing agent is limited primarily by the viscosity of the umpolymerized mixture, i.e. too high a concentration of reinforcing agent produces mixtures too viscous to cast or mold. The limitation imposed by viscosity is in turn dependent to some extent upon the shape of the particulate filler. That is, spherical particles do not increase the viscosity of the monomer mix as much as highly acicular particles. By choosing particulate fillers of suitable shape, it is possible to modify the viscosity of the monomer mix and prepare castable monomer mixtures which can be used to produce polymeric compositions containing a very large amount of reinforcing agent.

Another factor which has an effect upon the upper limit of reinforcing agent concentration is the particle size distribution of the filler. A wide distribution of particle sizes provides a composition with a small amount of voids or spaces between the particles, thereby requiring less polymer to fill these spaces and bind the particles together. Regarding granular particle size, generally particles which pass through a 60 mesh creen (250 microns) are small enough to be used in he compositions of this invention although particles as arge as 1000 microns (18 mesh) or more can be used vith equal or nearly equal success; with regard to a ower limit on particle size, particles as small as 0.5μ ave been successfully employed and smaller particles n the range of 100 to 200mμ can also be used. More escriptive of suitable filler particles than limits on paricle size is a specification of particle size distribution. suitable wide particle size distribution is as follows:

| | Percent |
|---|---|
| 250μ or less (60 mesh) | 100 |
| 149μ or less (100 mesh) | 90 |
| 44μ or less (325 mesh) | 50 |
| 5μ or less | 10 |

A narrower distribution also suitable for use in this ivention is:

| | Percent |
|---|---|
| 62μ or less (230 mesh) | 100 |
| 44μ or less (325 mesh) | 90 |
| 11μ or less | 50 |
| 8μ or less | 10 |

A relatively coarse mixture useful in this invention as the following particle size distribution:

| | Percent |
|---|---|
| 250μ or less (60 mesh) | 100 |
| 149μ or less (100 mesh) | 90 |
| 105μ or less (140 mesh) | 50 |
| 44μ or less (325 mesh) | 10 |

A finely-divided mixture has the following particle ize distribution:

| | Percent |
|---|---|
| 44μ or less (325 mesh) | 100 |
| 10μ or less | 90 |
| 2μ or less | 50 |
| 0.5μ or less | 10 |

Other typical particle size distributions of reinforcing iinerals used in this invention include:

| Wollastonite: | Percent |
|---|---|
| 74μ or less (200 mesh) | 100 |
| 44μ or less (325 mesh) | 99.7 |
| 11μ or less | 50 |
| 1μ or less | 8 |

| Feldspar: | Percent |
|---|---|
| 50μ or less | 100 |
| 40μ or less | 90 |
| 14μ or less | 50 |
| 10μ or less | 38 |
| 3μ or less | 10 |

hese figures regarding particle size distribution should ot be construed as limiting since both wider and narower ranges of distribution will also be useful as well s both coarser and finer compositions. Rather these gures are intended as representative illustrations of ller compositions suitable for use in the reinforced olymeric compositions of this invention.

Proper combination of the two variables of particle iape and particle size distribution, together with a satfactory processing technique, permits the preparation f molded polymeric compositions containing as much s 90% by volume or more reinforcing agent. The lower mit of reinforcing agent concentration is restricted insofar as it is necessary to have sufficient agent present to provide the extraordinary improvement in mechanical properties achieved by the compositions of this invention. The minimum level of reinforcing agent required to provide compositions with properties significantly superior to prior art compositions is about 25% by volume. The accompanying figure illustrates the theoretical values of modulus predicted by the Einstein and by the Kerner equations. Inspection of the figure indicates that at 20 volume percent filler or slightly higher, the two theoretical equations predict significantly different modulus values. The reason for this departure is that the Einstein equation is only reasonably accurate at low volume fractions of filler. Since considerations such as the relative mechanical properties of the two phases and the concentrations and size of the particulate filler, which become important as the quantity of filler is increased, are not considered in the Einstein equation, it is of little value in predicting modulus values of composites having more than about 20 to 25 volume percent rigid dispersed filler. When the above factors present in composites having high filler loadings are considered as in the Kerner equation, the theoretical moduli of composites increases at a significantly different rate. Comparison of the two equations shows the above factors exert such an important influence on composite containing more than 20 to 25% filler that composites containing high filler loadings actually differ in kind from composites containing lesser amounts. Also provided as points on the graph are actual experimental results obtained on some of the reinforced compositions of this invention which show a rough adherence to the trend indicated by the Kerner equation.

Suitable values, therefore, for reinforcing agent concentration in the finished compositions range from about 25 to about 90% by volume of the total compositions. The above range corresponds approximately to about 45 to about 95% by weight using a filler density of 2.7 and a polymer density of 1.1. Filler concentrations are expressed herein in terms of volume percent since mechanical properties are more directly related to the volume fraction of filler present as opposed to weight fractions. A preferred range of filler concentration is from about 33 to about 67% by volume or about 55 to about 84% by weight.

In addition, a small amount of fibrous material may be incorporated into a polymer system if the amount of granular or acicular material is reduced by some proportionately larger amount. For example, 2 or 3% by volume, based on the total reinforced composition, of glass fibers about 0.5 inch in length can be incorporated into a monomer slurry containing about 30 to 33% by volume granular feldspar. Similar quantities of chopped asbestos fibers or other fibrous materials can also be used. The resultant slurry can be cast about as readily as a monomer slurry containing 40% by volume granular feldspar. Alternatively, if pourability is not required, larger amounts of fibrous material can be included in the composition, thereby reinforcing the final product to an even greater extent.

COUPLING AGENTS

An essential material in the preparation of our reinforced polymeric compositions is the coupling agent which binds the inorganic filler to the polymer. Coupling agents useful herein are those substituted silanes of the formula $$X_a-\overset{\overset{\displaystyle Y_b}{|}}{Si}[R_n-Z]_c$$

where X is a hydrolyzable group capable of reaction with a hydroxyl group, Y is a hydrogen or a monovalent hydrocarbon group, R is an alkylene group having from 1 to about 20 carbon atoms, Z is a group capable of reaction with the polyamide, n is an integer from 0 to 1, a is an integer from 1 to 3, b is an integer from 0 to 2, c is an integer from 1 to 3, and the sum of a+b+c equals 4.

Examples of suitable X groups include halogen, hydroxy, alkoxy, cycloalkoxy, aryloxy, alkoxy-substituted alkoxy such as β-methoxy ethoxy, alkoxycarbonyl, aryloxycarbonyl, alkyl carboxylate and aryl carboxylate groups, preferably having eight or less carbon atoms. Examples of Y groups in the above formula are hydrogen, methyl, ethyl, vinyl isobutyl and other hydrocarbyl groups, preferably having ten or less carbon atoms. The function of the Y grouup can be to modify the extent of the polymer-filler bond, to regulate viscosity of the monomer slurry or polymer mix or to modify the thermal stability of the coupler. The R group can be any alkylene group having up to about 20 carbon atoms and preferably from about 2 to about 18 carbon atoms; examples include ethylene, propylene, decylene, undecylene, and octadecylene. Further, the R group need not necessarily be present at all as indicated by the value of zero for the letter n. For instance, vinyl-substituted silanes are effective couplers. In such an instance, the vinyl group which is a Z group, is attached directly to the silicon atom. Usually, however, the Z group is separated from the silicon atom by an R group having at least two carbon atoms in the linking chain. As the number of carbon atoms in the R group increases, the coupler can perform as a vicosity reducer. Further, the activity of the Z group on the alkylene chain is often modified somewhat, thereby making the coupler perform more suitably under some processing conditions. The Z group can be any functional group capable of reacting with a polyamide. Examples include, amino, primary or secondary amido, epoxy, isocyanato, hydroxy alkoxycarbonyl, aryloxycarbonyl, vinyl, allyl and halogen such as chloro and bromo groups.

It can be considered, as a working hypothesis, that chemical bonds are formed between polymer and coupler and between coupler and filler, but this has not been conclusively established. But those couplers which have functional groups capable of such reactions provide compositions with excellent properties whereas couplers not containing such functional groups generally provide compositions with inferior properties. Adhesion of polymer to filler involves dual considerations if the working hypothesis upon which this invention is based is accurate. The first consideration is the polymer-coupler interface. Adhesion of polymer and coupler can be achieved under any conditions which permit thorough contact of the two components. One means has been to mix the coupler and filler with the polyamide-forming monomers and conduct a polymerization. Another means has been to mix thoroughly a coupler, filler and preformed polymer. Other techniques which provide the requisite contact of polymer and coupler can also be used. Reaction can occur by several mechanisms such as aminolysis, alcoholysis, ester interchange and alkylation. Aminolysis can occur by reaction of amino groups or by amide interchange with primary or secondary amido groups with the amide groups of the polymer. Ester interchange can occur by the reaction of esters with the amide groups of the polymer. Alkylation can occur by a reaction where an ethylenically unsaturated group reacts with the amide group of the polymer. Alcoholysis can take place by the reaction of hydroxyl groups with an amide group. Additional reactions of amide groups with other functional groups are also known and can be used herein to provide the degree of adhesion of polymer to filler which forms the basis of the present invention. It should be noted in connection with the above comments on polyamide-functional group reaction that neither complete nor instantaneous reaction may be necessary. That is, if covalent bonding of polymer and coupler is responsible for the extraordinary improvement achieved by the practice of this invention, it is further theorized that only a fraction of the possible polymer-coupler bonds may provide as good or nearly as good properties in the finished compositions as would a complete reaction. The above hypothesis could explain why analytical characterization of the polymer-filler interface in terms of convalent or other types of bonds is as yet beyond the skill of the art.

The second consideration regarding the adhesion of polymer and filler is the coupler-filler interface. Filler and coupler can be joined by combining them in the absence or presence of a solvent for the coupler, such as water, alcohol, dioxane, benzene, etc. Presumably, the hydrolyzable group of the coupler reacts with appended hydroxyl groups attached to the alkaline surface of inorganic materials. Theoretically, hydroxyl groups are present on the surface of, or can be developed on the surface of, most metallic and siliceous substances, thereby providing a site available for reaction with a hydrolyzable group of a coupler. This theory of availability of hydroxyl groups on an inorganic surface may explain why many silicon-containing minerals are preferred reinforcing agents and why silicon-based coupling agents are particularly preferred for use with the siliceous minerals, i.e. the silane groups of the coupler $-Si-(OR)_3$, react with the silanol groups of the inorganic, $$-\overset{\overset{\displaystyle |}{|}}{\underset{\underset{\displaystyle |}{|}}{S}}-OH$$

to produce the very stable siloxane linkage, $$-\overset{\overset{\displaystyle |}{|}}{\underset{\underset{\displaystyle |}{|}}{Si}}-O-\overset{\overset{\displaystyle |}{|}}{\underset{\underset{\displaystyle |}{|}}{Si}}=$$

If the above theory is accurate, chemical bonding of coupler to the inorganic is achieved in the compositions of the present invention. Other theories can be advanced which deny the existence of true covalent bonds between inorganic and coupler. Regardless of any theoretical explanation advanced herein, to which we do not intend to be limited, the coupler is attached to the inorganic by contacting the two substances. The mixture is preferably but not necessarily subsequently dried. A bond between the inorganic and coupler is thus obtained. The reaction of filler and coupler can be carried out separately, and the filler-coupler adduct subsequently added to the monomer, or preformed polner, or the reaction may be carried out in the presence of the monomer or polymer and the whole mixture dried to remove volatile reaction products and solvents, if used. Preferably, heat in the range of 50 to 100°C or more is applied to a coupler-filler adduct to increase the extent of bonding.

Examples of suggested silane coupler include vinyl triethoxysilane, $CH_2{=}CHSi(OC_2H_5)_3$;
vinyl trimethoxysilane, $CH_2{=}CHSi(OCH_3)_3$;
vinyl methyldichlorosilane, $CH_2{=}CHSi(CH_3)Cl_2$;
vinyl tri(β-methoxyethoxy)silane, $CH_2{=}CHSi(OC_2H_4OCH_3)_3$;
methyl β-(methyldifluorosilyl)acrylate, $(F)_2(CH_3)SiCH{=}CHCOOCH_3$;
2-(trimethoxysilyl)ethyl methacrylate, $(CH_3O)_3SiC_2H_4OOCC(CH_3){=}CH_2$;
3-(triethoxysilyl)propyl methacrylate, $(C_2H_5O)_3SiC_3H_6OOCC(CH_3){=}CH_2$;
4-(trichlorosilyl)butyl acrylate, $(Cl)_3SiC_4H_8OOCCH{=}CH_2$;
6-(tricyclohexyloxysilyl)hexyl methacrylate, $(C_6H_{11}O)_3SiC_6H_{12}OOCC(CH_3){=}CH_2$;
11-(trimethoxysilyl)undecyl methacrylate, $(CH_3O)_3SiC_{11}H_{22}OOC\text{-}C(CH_3){=}CH_2$;
18-(triethoxysilyl)octadecyl acrylate, $(C_2H_5O)_3SiC_{18}H_{36}OOCCH{=}CH_2$;
18-(triacetoxysilyl)octadecyl acrylate, $(CH_3COO)_3SiC_{18}H_{36}OOCCH{=}CH_3$;
p-[3-trimethoxysilylpropyl] styrene, $(CH_3O)_3SiC_3H_6C_6H_4CH{=}CH_2$;
3-(triethoxysilyl)propyl chloride, $(C_2H_5O)_3SiC_3H_6Cl$;
11-(trimethoxysilyl)undecyl bromide, $(CH_3O)_3SiC_{11}H_{22}Br$;
ethyl β-triethoxysilyl propionate, $(C_2H_5O)_3SiC_2H_4COOC_2H_5$;
methyl ω-trimethoxysilylundecylate, $(CH_3O)_3SiC_{10}H_{20}COOCH_3$; glycidoxypropyl trimethoxysilane,

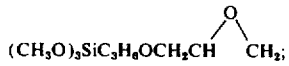

trimethoxysilylethyl-3,4-epoxycyclohexane, $(CH_3O)_3SiC_2H_4C_6H_9O$;
N-triethoxysilylpropyl amine, $(C_2H_5O)_3SiC_3H_6NH_2$;
N-trimethoxysilylpropyl-N(β-aminoethyl)amine, $(CH_3O)_3SiC_3H_6NHC_2H_4NH_2$; and
N-trimethoxysilylundecyl amine, $(CH_3C)_3SiC_{11}H_{22}NH_2$.

The amount of coupler with which the inorganic is treated is relatively small. As little as one gram of coupling agent per 1000 grams of filler produces a polymeric composition with mechanical properties superior to those of a polymeric composition containing an untreated filler. Generally, quantities of coupler in the range of 2.0 to 40.0 grams per 1000 grams of reinforcing agent have been found most satisfactory although quantities in excess of that range may also be used.

Several of the compositions of this invention are characterized by mechanical properties superior to related prior art compositions. As previously mentioned, one value helpful in screening suitable materials from suitable materials is the Strength Index. Generally, the higher the Strength Index of a composition, the more valuable it is for several of the uses mentioned above. Strength Index is the product of the notched izod impact strength and the square of the flexural strength and is referred to herein by the abbreviated notation $S^2I$ (strength$^2$ impact). Compositions particularly preferred for several heavy-duty uses are those having a Strength Index at least triple that of an equivalently filled but uncoupled polyamide and a flexural modulus at least double that of the corresponding unfilled polyamide. Equivalent filling is obtained by using the same filler, same particle size, same concentration and same manner of mixing with the same polymer matrix. For many preferred compositions, the Strength Index of the reinforced compositions will be six or eight times as great as the Strength Index of the equivalently filled compositions and the flexural modulus will be at least triple that of the base resin. Numerical values will vary depending upon the particular polyamide under consideration. The reinforced nylons such as polycaprolactam and polyhexamethylene adipamide are characterized by Strength Index values of at leasat $40 \times 10^6$ ft. lbs.$^3$ in.$^{-5}$ together with flexural moduli of at least 250,000 p.s.i. Preferable minimum levels for Strength Index and flexural modulus of reinforced nylon 6 and 6,6 are $50 \times 10^6$ and 300,000, respectively. Flexural strength and modulus are measured as described in ASTM D-790. Izod notched impact strength is measured as described in ASTM D-256, procedure A. The above measurements of properties are made on moisture-equilibrated samples which have been boiled in water 72 hours, cooled to room temperature and tested while wet.

PROCESS

The compositions of this invention can be prepared by polymerizing polyamide-forming monomers in the presence of coupler-treated fillers.

one technique used with considerable success in the practice of this invention has been to conduct a base-catalyzed, substantially anhydrous polymerization of a lactam having a coupler-treated filler dispersed therein. The filler can be treated with the coupler prior to its addition to the lactam monomer or the treatment can be achieved by mixing together filler, coupler, monomer and other optional additives. Base-catalyzed substantially anhydrous lactam polymerizations are carried out by methods known to those skilled in the art using appropriate catalysts, promoters, regulators, stabilizers, curing agents, etc. necessary to achieve the polymerization of a selected lactam monomer. To prepare the compositions of this invention, it is necessary to add to a lactam monomer, in addition to the above components, the coupler-treated filler. The polymerization is advantageously carried out in a manner described in U.S. Pat. Nos. 3,017,391, 3,017,392, 3,018,273 or 3,028,369 utilizing promoters, catalysts and regulators specified therein. One procedure suitable for preparing reinforced polyamides comprises first mixing the lactam monomer, coupler, filler, water and if desired, a cross-linking agent, internal mold release agent, stabilizer or other additives. Mixing is most effectively carried out if the lactam is in a molten condition. When high concentrations of reinforcing agent are used, e.g. 35 or 40% by volume or more, it may be advisable to add the components in the order just given in order to effectively disperse the ingredients. If water is used, it is advisable to use a small quantity, less than 10% of the total weight of the mixture, so that its complete removal from the mixture is facilitated. About 1 to 5% water based on the weight of the mixture is usually sufficient. After thorough mixing, the mixture is heated to about 110 – 120°C, but less than 160°C, to remove any water and the hydrolyzed R groups of the coupler. A vacuum can be applied to aid in removing the volatile materials. The temperature of the mixture is then adjusted to some temperature above the melting point of the lactam, about 100°C for ε-caprolactam, and the polymerization catalyst is added. Any of the catalysts known to be acceptable for base-catalyzed lactam polymerizations are adequate; a preferred catalyst is an alkylmagnesium halide such as ethylmagnesium bromide.

Another preferred catalyst is sodium caprolactam. If a Grignard reagent is used, the temperature of the mixture is held around 100°C to permit the volatilization of the alkane formed by reaction of the Grignard with the lactam monomer. Following addition of the catalyst and removal of alkane if necessary, the promoter or initiator is added. Any of the promoters useful in base-catalyzed lactam polymerizations can be used. Examples include carbon monoxide; acyl caprolactams such as acetyl caprolactam; N,N'-substituted carbodiimides such as diisopropylcarbodiimide and dicyclohexylcarbodiimide; and N,N-substituted cyanamides such as N,N-diphenyl cyanamide. Other suitable promoters include lactams having attached to the imido group a heterocyclic substituent containing from one to three heterocyclic atoms wherein at least one of the heterocyclic atoms is a nitrogen atom and wherein the imido group of the lactam is attached to a carbon atom in the heterocyclic ring so situtated that the nitrogen atom of the imido group and the nitrogen atom of the heterocyclic ring are connected by an odd number of conjugated carbon atoms. Examples of this class of promoters include: N-(2-pyridyl)-ε-caprolactam; N-(4-pyridyl)-ε-caprolactam; tris-N-(2,4,6-triazino)-ε-caprolactam; and N-(2-pyrazinyl)-ε-caprolactam. These promoters can be formed by the in situ reaction of a lactam with such compounds as 2-chloropyridine, 4-bromopyridine, 2-bromopyrazine, 2-methoxypyridine, 2-methoxypyrazine, 2,4,6-trichloro-s-triazine, 2-bromo-4,6-dichloro-s-triazine, and 2,4-dimethoxy-6-chloro-s-triazine. A preferred class of promoters, namely organic isocyanates, is described in detail in U.S. 3,028,369. Specific promoters preferred in our present polymerization include phenyl isocyanate, 2,4- and 2,6-tolylene diisocyanate, di-(p-isocyanatophenyl) methane and a polyfunctional isocyanate such as Mondur MR manufactured by Mobay Chemical Company. Alternately, the promoter may be added before the catalyst. Whichever procedure is followed, once the mixture contains the monomer, promotor, and catalyst, for most systems it is necessary to keep the temperature below 140°C, preferably below 120°C, to prevent too rapid polymerization until the mixture is cast. Some catalyst-promoter systems, such as the alkyl magnesium chloride-acetyl caprolactam system, will require even a further reduction in heat to less than 80°C. to prevent polymerization. It is also advisable when employing a reactive catalyst-promoter system to reduce the time intervening between the addition of the catalyst-promoter and the casting or molding of the mixture. After the mixture has been thoroughly stirred and allowed to come to equilibrium, the mixture is cast into a mold, which is preferably preheated, and polymerized at a temperature from about the melting point of the lactam up to about 250°C, preferably from about 140° to about 200°C. Time for polymerization can vary from as little as one minute or less up to an hour or more and usually requires from two or three minutes up to about ten minutes with most preferred catalyst-promoter systems. Other lengths of time and temperatures for polymerization are of course satisfactory and can be used with equal or nearly equal success.

Selection of specific coupling agents can provide important benefits in the preparation of reinforced polyamides by a base-catalyzed lactam polymerization process. For instance, U.S. Pat. No. 3,017,392 describes the use of polymerization regulators in a base-catalyzed lactam polymerization. By choosing an aminosilane coupler such as 3-triethoxysilylpropyl amine, the coupler can function as a polymer adherent, filler adherent and polymerization regulator simultaneously. In an alternate process, a compound such as N-phenyl, N-3-(triethoxysilyl) propyl urea can be used as a promoter as well as a coupler to achieve good adhesion of polymer to filler as well as initiation of the lactam polymerization.

Not all coupling agents described herein as useful in preparing reinforced polyamides can be used successfully when the polyamide is prepared by a base-catalyzed anhydrous lactam polymerization in the presence of coupler and filler. Again, theoretical conclusions are uncertain but experimental data indicate that for a compound to be an effective coupler in a base-catalyzed lactam polymerization, it must not only be capable of reaction with a polyamide but must further be incapable of a reaction with a monomeric lactam which will leave the silane reaction product incapable of entering into the polymerization. For instance, ethylenically unsaturated silanes perform as satisfactory couplers in a reinforced polyamide when the preformed polymer is mixed with the coupler and filler, and the composition fabricated into a finished article. Similarly, the above couplers can be used advantageously in a condensation polymerization of a polyamine and polycarboxylic acid. But the ethylenically unsaturated silane couplers are only marginally effective in a base-catalyzed lactam polymerization. Silane couplers where the Z group is a halogen atom are also only marginally effective. It is postulated that a reaction of monomeric lactam and coupler such as the following occurs before polymerization;

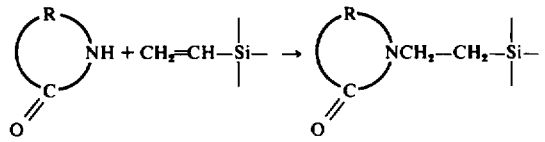

The substituted monomeric lactam product, absent its active hydrogen atom, cannot enter into the polymerization and the coupler cannot become bound to the polymer. Hence, preferred silane couplers useful in a lactam polymerization have Z groups which are capable of reaction with a polyamide but incapable of a reaction with a monomeric lactam which leaves the silane reaction product unable to enter the polymerization. Vinyl, allyl and halogens are examples of Z groups included by the broad definition of suitable couplers but excluded by the above narrower class.

Regarding the preparation of castable compositions by the preferred method previously mentioned, it may be advisable, particularly in the case of high loadings, of reinforcing agents where a slight increase in viscosity caused by partial polymerization cannot be tolerated, to provide means for injection of the promoter (or alternately the catalyst) into the monomer mixture as it is being poured or forced into the mold. Such a technique completely prevents an increase in viscosity of the monomer mixture due to polymerization until the mixture is cast. Another technique useful with high loadings of reinforcing agents which aids in overcoming the difficulties presented by high viscosity is a pressurized injection of the monomer mixture into the mold. A technique which we have found useful in decreasing the viscosity of monomer filler-coupler slurries comprises adding a small amount of a surface-active agent to the slurry. Such a decrease in viscosity is advantageous for two reasons. It permits the formation of a finer, smoother finish on the final product. Occasionally a finished composition with a high reinforcing agent content, e.g. 60% by volume or about 79% by weight filler, may have a granular or coarse texture and may even contain voids or open spaces due to the inability of the viscous mixture to flow together completely prior to polymerization. The addition of a surface-active agent eliminates this problem and produces a smooth, attractive finish on highly reinforced compositions. Alternatively, if a smooth finish is not a necessary feature for certain applications, then a decrease in viscosity permits incorporation of larger amounts of reinforcing mineral into the monomer mixture. This surface active agent may be either anionic, cationic, nonionic or mixtures thereof. Examples include zinc stearate, dioctadecyl dimethyl ammonium chloride, and ethylene oxide adducts of stearic acid. Preferred compounds are the metal and quaternary ammonium salts of long-chain carboxylic acids. A concentration of surfactant in the range of 0.05–0.5% by weight of the total compositions has been found useful. However, lower concentrations may also be used. At higher concentrations of surface-active agent, it may be necessary to use additional catalyst and promoter.

In addition to the base-catalyzed, substantially anhydrous anionic lactam polymerization referred to above, reinforced polyamides can also be prepared by the conventional hydrolytic polymerization of lactams in the presence of coupler and filler as well as by polymerization of aminocaproic acids.

Another process useful herein is the condensation polymerization of a polyamine and polycarboxylic acid in the presence of coupler and filler. Preferably the amine and carboxylic acid are both difunctional. Examples of amines include tetramethylene diamine, pentamethylene diamine, hexamethylene diamine, octamethylene diamine, dodecamethylene diamine and bis(paraamino cyclohexyl) methane. Suitable dicarboxylic acids include adipic, pimelic, suberic, azelaic, sebacic, dodecanedioic and terephthalic acids. Amine salts of the acids are formed by reacting equivalent amounts of the amine and acid in a suitable solvent for the salt such as water or alcohol and recovering the salt. By way of example, the salt is dissolved in water to form a 50 to 75% aqueous solution. A filler pretreated with a silane coupler is added to the solution. The reactor is then sealed and heated to about 200 to 240° C to develop a pressure of 250 p.s.i. After an hour or two, the temperature is raised to 270 to 300°C as steam is bled off to maintain the pressure at 250 p.s.i. The pressure is then gradually reduced to atmospheric pressure and additional water removed. The polymer-coupler-filler mixture can be extruded, chopped and molded to form compositions having excellent mechanical properties. Other methods of preparing reinforced polyamides by condensation polymerization can also be employed using an inert solvent for the salt such as phenol, cresol or xylenol and a non-solvent such as the hydrocarbons or chlorinated hydrocarbons optionally included.

Still another method of preparing reinforced polyamides comprises mixing together a polyamide, coupler and filler under conditions which provide thorough contact of the filler-coupler adduct with the polyamide. One method has been to place the three components in some container and agitate them to achieve some sort of crude dispersion. The dispersion is then processed through an extruder, chopped into granules and injection molded. The filler can either be pre-treated with the coupler or treated with the coupler in the presence of the polymer. Another processing technique comprises milling the components followed by compression molding. Oxidative degradation of the polymer becomes a problem, however, unless care is taken to exclude air during the milling operation. Other processing techniques are also applicable to this invention.

Polyamides prepared by any of the above processes can be reformed into granules, pellets or powders and subsequently reworked if the degree of crosslinking in the polymer is minimized. One technique for reworking comprises extrusion followed by injection molding.

Such techniques, either singly or in combination with other techinques known in the art, are useful in obtaining the highly reinforced compositions of this invention.

The invention will be more clearly understood from the detailed description of the following specific examples which set forth some of the preferred compositions, the methods of preparing them, and the superior mechanical properties attained by the practice of this invention. Quantities of reinforcing agents are expressed in weight percent.

EXAMPLE 1

A quantity of 300 grams (2.65 moles) of ε-caprolactam was melted in a flask under an atmosphere of dry nitrogen. To this melt was added with stirring 750 grams of milled spodumene, a lithium aluminum silicate. Following this, 3.5 ml. water and 6.4 grams (6.8 ml.) of 3-aminopropyl triethoxysilane were also added. The mixture was heated to 150°C under a slight vacuum to remove water and ethanol. The distillation was continued until 50 grams of caprolactam had also been removed. The vacuum was released and the mixture allowed to cool to around 115°C, at which time 3.7 grams (3ml.) of an 80/20 mixture of 2,4- and 2,6-diisocyanatotoluene (TD-80) was added and mixed for several minutes. To this mixture, 8.3 ml. of a 3 molar solution of ethylmagnesium bromide in diethyl ether was added slowly with stirring. Again a vacuum was applied until all the ether and ethane were removed, as evidenced by the complete dispersal of the catalyst in the mixture. After release of the vacuum, the slurry was poured into a mold, preheated to 200°C and polymerized for one hour. The finished product contained 51% by volume (75 wt. percent) spodumene.

Subsequent preparations patterned on this example use identical quantities of all materials specified above unless otherwise noted.

EXAMPLE 2

The procedure described in Example 1 was followed except that 750 grams of quartz with a wide particle size distribution was substituted in place of the spodumene. The finished product contained 55% by volume (75 wt. percent) quartz.

EXAMPLE 3

The procedure described in Example 1 was followed except that 750 grams of crystalline silica having a maximum particle size of 5μ and an average particle of 2μ was used instead of the spodumene. The finished product contained 55% by volume silica.

EXAMPLE 4

The procedure described in Example 1 was followed except that 450 grams of ε-caprolactam, 456 grams of wollastonite, a calcium metasilicate, 5.7 grams (4.7 ml.) of the difunctional isocyanate and 13.3 ml. of a 3 molar solution of ethylmagnesium bromide in diethyl ether were used in place of the corresponding materials or quantities stated in Example 1. The finished product contained 32% by volume (53 wt. percent) wollastonite.

EXAMPLE 5

The procedure described in Example 1 was followed except that 350 grams of ε-caprolactam, 700 grams of feldspar which is an aluminum-alkali metal-alkaline earth metal silicate, 4.3 grams (3.5 ml.) of the difunctional isocyanate, and 10 ml. of a 3 molar solution of ethylmagnesium bromide in diethyl ether were used in place of the corresponding materials or quantities stated in Example 1. The finished product contained 49% by volume (70 wt. percent) feldspar.

EXAMPLE 6

The procedure described in Example 1 was followed except that 400 grams of ε-caprolactam, 650 grams of wollastonite, 4.9 grams (4.0 ml) of the difunctional isocyanate, and 10 ml. of a 3 molar solution of ethylmagnesium bromide dissolved in diethyl ether were used in place of the corresponding materials or quantities stated in Example 1. The finished product contained 43% by volume (65 wt. percent) wollastonite.

EXAMPLE 7

The procedure described in Example 1 was followed except that 400 grams of ε-caprolactam, 700 grams of mullite which is an aluminum silicate, 6.8 grams (7.3 ml.) of 3-aminopropyl triethoxysilane, 3.7 ml water, 4.3 grams (3.5 ml.) of the difunctional isocyanate and 10 ml. of a 3 molar solution of ethylmagnesium bromide in diethyl ether were used in place of the corresponding materials or quuantities stated in Example 1. In addition, 100 grams of ε-caprolactam was withdrawn by distillation instead of 50 grams. The finished product contained 48% by volume (70 wt. percent) mullite.

EXAMPLE 8

The procedure described in Example 1 was followed except that 750 grams of mullite was used instead of spodumene. The finished product contained 54% by volume (75 wt. percent) mullite.

EXAMPLE 9 the procedure described in Example 6 was followed. In addition, 1.25 grams of polyethylene imine was added as a crosslinking agent.

EXAMPLE 10

The procedure described in Example 6 was followed except that 3-(N-ethylamino)-aminopropyl trimethoxysilane was substituted in place of the 3-aminopropyl triethoxysilane.

EXAMPLE 11

The procedure described in Example 6 was followed except that 7 ml. water was used. In addition, 6.4 grams (6.8 ml.) of tetraethyl silicate was added.

EXAMPLE 12

The procedure described in Example 6 was followed In addition, 6.4 grams of diphenylsilanediol was added

EXAMPLE 13

The procedure described in Example 1 was followec except that 342 grams of ε-caprolactam, 650 grams o wollastonite, 58 grams of a chlorinated terphenyl (62% Cl), 4.1 grams (3.4 ml.) of a difunctional isocyanate and 8.8 ml. of a 3 molar solution of ethylmagnesiur bromide in diethyl ether were added in place of the cor responding materials or quantities stated in Example 1 The finished product contained 43% by volume (65 wt percent) wollastonite, 29.2% by weight polycaprolactam, and 5.8% by weight of the chlorinated terphenyl

EXAMPLE 14

The procedure described in Example 1 was followed except that 750 grams of alumina was used in place of the spodumene. The finished product contained 49% by volume (75 wt. percent) alumina.

EXAMPLE 15

The procedure described in Example 6 was followed except that 7.2 grams (6.0 ml.) of Mondur MR (a polyfunctional isocyanate) was used as the promoter instead of the difunctional isocyanate of Example 1.

EXAMPLE 16

The procedure described in Example 6 was followed except that 450 grams of ε-caprolactam and 600 grams of wollastonite were used in place of the corresponding quantities stated in Example 6. In addition, 7.2 grams (6.0 ml) of Mondur MR was used as the promoter instead of the difunctional isocyanate. Further, 1.25 grams of polyethylene imine was added as a crosslinking agent. The finished product contained 38% by volume (60 wt. percent) wollastonite.

EXAMPLE 17

The procedure described in Example 1 was followed except that 750 grams of enstatite which is a magnesium metasilicate was used in place of the spodumene. The finished product contained 51% by volume (75 wt. percent) enstatite.

EXAMPLE 18

A quantity of 350 grams (3.1 moles) of ε-caprolactam was melted in a flask under an atmosphere of dry nitrogen. To this melt was added with stirring 6.4 grams (6.8 ml.) of 3-aminopropyl triethoxysilane, 650 grams of wollastonite, and 3.5 ml. water. The mixture was heated to 150°C under a slight vacuum to remove water and ethanol by-product. The distillation was continued until 50 grams of caprolactam had also been removed. The vacuum was released and the mixture allowed to cool to around 115°C, at which time 11.7 ml. of a 3 molar solution of ethylmagnesium bromide in diethyl ether was added with stirring. A vacuum was applied until the catalyst was dispersed. Then a mixture of 50 grams of caprolactam and 14.4 grams (12 ml.) of Mondur MR was added. This mixture was prepared by mixing the two components, heating them to around 120°C to cause their reaction, and distilling volatile reaction products under a high vacuum. After addition of the reacted Mondur MR promoter, the mixture was stirred for 5 or 10 minutes under a vacuum, then cast into a old preheated to 200°C and allowed to polymerize for ıe hour. The finished product contained 43% by volne (65 wt. percent) wollastonite.

EXAMPLE 19

The procedure described in Example 18 was folwed except that 28.8 grams (24 ml.) of Mondur MR ıs used instead of the 14.4 grams (12 ml.) stated in :ample 18. In addition, 11 grams of tetra-(3-ymethylene-1-propylamine)methane was added to ɜ caprolactam before melting. This compound was ded as a crosslinking agent.

EXAMPLE 20

The procedure described in Example 18 was folwed except that 12.0 grams (10 ml.) of the difunc-ınal isocyanate was used in place of the Mondur MR. addition, 1.0 gram of zinc stearate was added with ɜ catalyst and 2.6 grams of polyethyleneamine was ded with the promoter. The surface of the finished mposition had a smooth attractive appearance.

EXAMPLE 21

A quantity of 300 grams (2.65 moles) of ε-caprolac-n was melted in a flask under an atmosphere of dry :rogen. To this melt was added with stirring 12.8 ams (13.6 ml.) of 3-aminopropyl triethoxysilane, 00 grams of mullite, and 7.0 ml. of water in the order ven. The mixture was heated to 150°C under a slight cuum to remove water and hydrolyzed ethanol. This ıtillation was continued until 50 grams of caprolac-n were removed. The mixture was allowed to cool to ɔund 115° C, whereupon 2.0 grams of zinc stearate d 8.5 ml. of a 3 molar solution of ethylmagnesium ɔmide in diethyl ether was added with stirring. A vac-m was applied to remove the ether and then 7.2 ams (6.0 ml) of Mondur MR was added and stirred : about 30 to 60 seconds. The slurry was cast into the eheated mold, using a pressurized injection to insure mplete filling of the mold, and polymerized at 200°C : one hour. The surface of the finished composition d a grain-like, somewhat coarse texture but was en-ely free from voids or open spaces large enough to versely affect the physical properties. The finished ɔduct contained 68% by volume (86 wt. percent) ıllite.

EXAMPLE 22

A polymeric composition was prepared according to ample 6 except that a finely-divided wollastonite was ɜd with a particle size distribution comparable to that ɜviously designated as suitable for a finely-divided xture. Additionally, a phenyl isocyanate promoter ıs used in place of the difuctional isocyanate. In addi-n, 1.8 grams of zinc stearate was added to the mono-ɜr slurry. The product was chopped into small pieces, ıced in a melt index device, heated to about 250°C, d extruded through a 1/16 inch orifice. The filament produced was then drawn by hand to approximately )20 inch in diameter. The filament surface was ooth and possessed excellent physical properties.

The Table I below gives flexural strengths, flexural ɔduli, and impact resistance values for polymeric mpositions of this invention. The flexural strength d modulus values were determined in accordance th ASTM test D 790-61. Impact resistance was deter-ned by the notched Izod impact test described in ;TM D 256-56. The numerical designations of polymeric compositions indicate compositions prepared as described in the corresponding examples. Composition A is a unfilled, unreinforced polycaprolactam prepared according to Example 6 of this disclosure except that no reinforcing agent or coupling agent was used. Composition B is a filled polycaprolactam containing 43% by volume wollastonite prepared according to Example 6 of this disclosure except that no coupling agent was used.

TABLE I

| Polymeric Composition | Flexural Strength, psi | Flexural Modulus, psi | Izod Notched Impact Resistance, ft. lbs./in. |
|---|---|---|---|
| A | 12,000 | $0.30\times10^6$ | 0.80 |
| B | 19,740 | 1.55 | 0.71 |
| 1 | 23,500 | 2.34 | 0.86 |
| 2 | 19,600 | 2.16 | 0.64 |
| 3 | 25,200 | 2.6 | 0.58 |
| 4 | 20,200 | 1.36 | 0.91 |
| 5 | 24,700 | 1.82 | 0.87 |
| 6 | 27,900 | 1.81 | 0.78 |
| 7 | 25,400 | 1.89 | 0.80 |
| 8 | 25,200 | 2.53 | 0.80 |
| 9 | 28,800 | 1.99 | 0.80 |
| 10 | 23,500 | 1.73 | 0.72 |
| 11 | 25,700 | 1.61 | 0.58 |
| 12 | 25,800 | 1.75 | 0.82 |
| 13 | 22,000 | 1.57 | 0.74 |
| 14 | 24,900 | 2.53 | 0.66 |
| 15 | 30,200 | 2.09 | 0.80 |
| 16 | 22,700 | 1.34 | 1.00 |
| 17 | 24,800 | 2.15 | 0.77 |
| 18 | 25,820 | 1.69 | 0.74 |
| 19 | 15,475 | 1.03 | 0.84 |
| 20 | 28,120 | 1.79 | 0.76 |

The above Table I demonstrates the great improvement in mechanical properties achieved by the reinforced polymeric compositions of this invention as compared to an unfilled, unreinforced polyamide and a filled but unreinforced polyamide. The flexural strength of unfilled, unreinforced polyamides has been more than doubled in some cases by reinforcement and has been increased by from 5% to more than 30% when compared to merely filled polyamides. The modulus has been increased approximately by a factor of 6 to 8 when compared to the unfilled, unreinforced polyamide prepared in a comparable manner and by as much as 70% when compared to the filled polyamide prepared in a comparable manner. Additionally, impact resistance of 1 foot pound per inch has been achieved with certain reinforcing media. The most accurate comparison for assessing the improvement achieved by the adherent bonding of the present invention vs. conventional filling is obtained by comparing Sample B with Sample 6, the only difference in preparation being the inclusion of a coupling agent in Sample 6. It should be noted here that normal filling of a polyamide, although occasionally resulting in increased flexural strength and modulus, also results in poorer impact resistance. However, this invention provides not only increased strength and modulus but also increased impact resistance.

Sample 19 is an example of a highly crosslinked polyamide which can be prepared to satisfy certain particular requirements. Although the flexural strength and modulus of this composition is somewhat lower than similarly prepared uncrosslinked polyamides and the notched impact resistance is only average, the composition does not break during flexural strength testing, but rather bends into a U-shape without fracturing. Further the impact resistance increases markedly when the sample is wet. The following is a comparison of Samples 15 and 19 which are similar in all respects except as to the degree of crosslinking:

| Polymeric Composition | Flexural Strength, psi | Deflection, inches | Flexural Modulus psi dry | Flexural Modulus psi wet | Izod Notched impact dry | Izod Notched impact wet |
|---|---|---|---|---|---|---|
| 15 | 30,200 | .29 | 2.09 | .80 | .80 | .89 |
| 19 | 15,475 | no break | 1.03 | .25 | .84 | 2.04 |

Of course, compositions with properties intermediate between these two samples can easily be prepared to take advantages of the high wet impact strength and resistance to fracture of the crosslinked polyamide composition. Further improvements due to crosslinking of the polymer may be seen by comparison of Samples 6 and 9, Sample 9 containing polymer crosslinked with polyethylene imine. Comparison of Samples 6 and 15 shows the improvement achieved by the use of the polyfunctional isocyanate promoter as compared to the difunctional isocyanate.

EXAMPLES 23 to 38

The following runs were carried out to demonstrate the effects of different coupling agents upon reinforced polyamides prepared by the base-catalyzed, substantially anhydrous anionic polymerization of a lactam in the presence of a coupler-treated filler.

The inorganic mineral was contacted with 0.3% by weight of the silane coupling agent and stirred for 30 minutes at 130°C and for an additional 20 minutes as the mixture was cooled to 90° C. The treated mineral was added to molten ε-caprolactam. To the monomer-mineral slurry was added 10 mmoles of toluene diisocyanate per mole of caprolactam. A vacuum was then applied for 5 minutes to remove volatile reaction products. To the resultant slurry either 7 millimoles of the magnesium catalyst or 11 millimoles of the sodium polymerization catalyst per mole of caprolactam was added and the mixture cast into a sheet mold ¼ inch thick. The mold was preheated to 200°C and maintained at this temperature for 10 minutes after casting, after which time the mold was cooled and the polymerized article removed. Properly data are reported in Table II below. Also reported in the table are the type of filler, volume fraction of filler, type of silane coupler and catalyst system. One of two types of catalyst were used — ethylmagnesium bromide or sodium caprolactam, *which are designated in the table as Mg and Na, respectively.*

TABLE II

| Composition No. | Filler | Volume Fraction | Coupler | DRY Flex. Str. psi × $10^{-3}$ | DRY Flex. Mod. psi × $10^{-6}$ | DRY Impact ft.lb./in. |
|---|---|---|---|---|---|---|
| 23 | wollastonite | .42 | $(C_2H_5O)_3SiC_3H_6NH_2$ | 25.4 | 1.70 | 0.5 |
| 24 | wollastonite | .42 | $(C_2H_5O)_3SiC_3H_6NH_2$ | 24.3 | 1.42 | 0.7 |
| 25 | wollastonite | .42 | $(C_2H_5O)_3SiC_2H_4CN$ | 11.5 | 0.95 | 0.2 |
| 26 | wollastonite | .42 | $(CH_3O)_3SiC_{11}H_{22}Br$ | 14.7 | 1.15 | 0.3 |
| 27 | wollastonite | .42 | $(C_2H_5O)_3SiC_3H_6Cl$ | 15.8 | 1.01 | 0.5 |
| 28 | quartz | .52 | $(C_2H_5O)_3SiC_3H_6Cl$ | 9.3 | 0.75 | 0.1 |
| 29 | quartz | .52 | $(CH_3O)_3SiC_2H_4$ 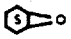 | 10.6 | 0.70 | 0.4 |
| 30 | quartz | .52 | $(C_2H_5O)_3SiC_3H_6NH_2$ | 12.4 | 0.71 | 0.5 |
| 31 | wollastonite | .42 | $(CH_3OC_2H_4O)_3SiCH{=}CH_2$ | 14.7 | 1.15 | 0.3 |
| 32 | wollastonite | .42 | $(CH_3O)_3Si(CH_2)_{11}NH_2$ | — | — | — |
| 33 | wollastonite | .42 | $Cl_3SiCH{=}CHCOOC_4H_9$ | — | — | — |
| 34 | wollastonite | .42 | $Cl_2Si(CH_3)CH{=}CHCOOC_4H_9$ | — | — | — |
| 35 | wollastonite | .42 | $Cl_3$-Si- 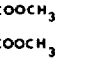 | — | — | — |
| 36 | wollastonite | .42 | $Cl_3{-}Si(CH_3)CH_2CH(CH_3)COOCH_3$ | — | — | — |
| 37 | wollastonite | .42 | $Cl_3SiCH{=}CHCOOC_2H_5$ | — | — | — |
| 38 | wollastonite | .42 | $H_2N(CH_2)_5{-}CO{-}NH(CH_2)_3Si(OMe)_3$ | — | — | — |

| Composition No. | Filler | Volume Fraction | Coupler | WET Flex. Str. psi × $10^{-3}$ | WET Flex. Mod. psi × $10^{-6}$ | WET Impact ft.lb./in. | S²I |
|---|---|---|---|---|---|---|---|
| 23 | wollastonite | .42 | $(C_2H_5O)_3SiC_3H_6NH_2$ | 9.3 | 0.48 | 1.0 | 87 |
| 24 | wollastonite | .42 | $(C_2H_5O)_3SiC_3H_6NH_2$ | 6.8 | 0.35 | 2.3 | 106 |
| 25 | wollastonite | .42 | $(C_2H_5O)_3SiC_2H_4CN$ | 5.0 | 0.36 | 0.8 | 20 |
| 26 | wollastonite | .42 | $(CH_3O)_3SiC_{11}H_{22}Br$ | 4.9 | 0.27 | 0.9 | 22 |
| 27 | wollastonite | .42 | $(C_2H_5O)_3SiC_3H_6Cl$ | 5.3 | 0.34 | 0.7 | 20 |
| 28 | quartz | .52 | $(C_2H_5O)_3SiC_3H_6Cl$ | 3.5 | 0.35 | 1.4 | 17 |
| 29 | quartz | .52 | $(CH_3O)_3SiC_2H_4$ 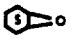 | 5.2 | 0.34 | 0.6 | 16 |
| 30 | quartz | .52 | $(C_2H_5O)_3SiC_3H_6NH_2$ | 6.4 | 0.36 | 1.9 | 78 |
| 31 | wollastonite | .42 | $(CH_3OC_2H_4O)_3SiCH{=}CH_2$ | 4.9 | 0.27 | 0.9 | 22 |
| 32 | wollastonite | .42 | $(CH_3O)_3Si(CH_2)_{11}NH_2$ | 10.6 | — | 0.71 | 80 |
| 33 | wollastonite | .42 | $Cl_3SiCH{=}CHCOOC_4H_9$ | 10.9 | — | 0.44 | 52 |
| 34 | wollastonite | .42 | $Cl_2Si(CH_3)CH{=}CHCOOC_4H_9$ | 10.9 | — | 1.0 | 119 |
| 35 | wollastonite | .42 | $Cl_3$-Si- 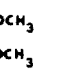 | 10.2 | — | 0.40 | 42 |

TABLE II-continued

| Composition No. | Filler | Volume Fraction | Coupler | DRY Flex. Str. psi × $10^{-3}$ | Flex. Mod. psi × $10^{-6}$ | Impact ft.lb./in. | |
|---|---|---|---|---|---|---|---|
| 36 | wollastonite | .42 | $Cl_2-Si(CH_3)CH_2CH(CH_3)COOCH_3$ | 10.0 | — | 0.71 | 71 |
| 37 | wollastonite | .42 | $Cl_3SiCH=CHCOOC_2H_5$ | 13.7 | — | — | — |
| 38 | wollastonite | .42 | $H_2N(CH_2)_3-CO-NH(CH_2)_3Si(OMe)_3$ | 13.3 | — | — | — |

Inspection of the above data shows that silanes having as their Z groups a vinyl group or halogen atom are inferior to silane couplers whose Z groups are capable of reacting in the manner described. Specifically, Compositions 23, 24, 30, 32, 33, 34, 35, 36, 37 and 38 have mechanical properties significantly superior to Compositions 25, 26, 27, 28, 29 and 31.

EXAMPLES 39 to 51

The following runs demonstrate the applicability of the present invention to reinforced polyamides prepared by dispersing the coupler-treated filler in the preformed polyamide.

Nylon 6,6 (Zytel 101) molding powder was placed in a polyethylene bag to which was added sufficient wollastonite to provide a finished composition having 0.42 volume fraction filler (65% by wt.) and alkoxysilane coupler equal to 1% by weight of the filler. The contents of the bag were agitated for about 30 to 60 seconds and then placed in an extruder having a 1 inch screw and 18 inch barrel length. The contents were run through the extruder twice at 270° C. The extrudate was chopped into a molding powder and injection molded at 260°C and 600 p.s.i. Mechanical properties are reported to Table III below.

TABLE III

| Composition No. | Coupler | DRY Flex. Str. psi × $10^{-3}$ | Flex. Mod. psi × $10^{-6}$ | Ten. Str. psi × $10^{-3}$ | Impact ft.lb./in. |
|---|---|---|---|---|---|
| 39 | no coupler | 17.6 | 1.33 | 9.1 | 0.4 |
| 40 | $(C_2H_5O)_3SiC_2H_4CN$ | 17.6 | 1.67 | 10.5 | 0.2 |
| 41 | $(C_2H_5O)_3SiOC_{10}H_{21}$ | 16.9 | 1.51 | 9.4 | 0.2 |
| 42 | $Cl_3SiCH_3$ | 13.0 | 1.47 | 7.6 | 0.1 |
| 43 | $(C_2H_5O)_3SiC_5H_{11}$ | 12.0 | 1.48 | 7.2 | 0.2 |
| 44 | $(C_2H_5O)_3Si-$ 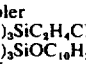 | 13.7 | 1.64 | 7.8 | 0.2 |
| 45 | $(C_2H_5O)_3SiC_3H_6Cl$ | 20.5 | 1.51 | 11.2 | 0.3 |
| 46 | $(CH_3O)_3SiCH=CH_2$ | 19.7 | 1.39 | 11.6 | 0.5 |
| 47 | $(C_2H_5O)_3SiCH=CH_2$ | 21.7 | 1.49 | 12.0 | 0.4 |
| 48 | $(CH_3O)_3SiC_2H_4$ 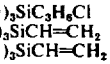 | 22.3 | 1.66 | 12.5 | 0.5 |
| 49 | $(C_2H_5O)_3SiC_3H_6NH_2$ | 24.9 | 1.57 | 13.1 | 0.5 |
| 50 | $(CH_3OC_2H_4O)_3SiCH=CH_2$ | 21.4 | 1.43 | 12.1 | 0.5 |
| 51 | $(CH_3O)_3SiC_{11}H_{22}Br$ | 22.0 | 1.62 | 12.3 | 0.4 |

| Composition No. | Coupler | WET Flex. Str. psi × $10^{-3}$ | Flex. Mod. psi × $10^{-6}$ | Ten. Str. psi × $10^{-3}$ | Impact ft.lb./in. | $S^2I$ |
|---|---|---|---|---|---|---|
| 39 | no coupler | 2.8 | 0.12 | 2.4 | 0.7 | 5 |
| 40 | $(C_2H_5O)_3SiC_2H_4CN$ | 5.7 | 0.41 | 3.1 | 0.4 | 13 |
| 41 | $(C_2H_5O)_3SiOC_{10}H_{21}$ | 4.4 | 0.27 | 3.3 | 1.2 | 23 |
| 42 | $Cl_3SiCH_3$ | 4.0 | 0.27 | 2.2 | (1.5)* | 24 |
| 43 | $(C_2H_5O)_3SiC_5H_{11}$ | 4.4 | 0.3 | 2.3 | (1.3)* | 25 |
| 44 | $(C_2H_5O)_3Si-$  | 4.8 | 0.33 | 2.4 | (1.2)* | 28 |
| 45 | $(C_2H_5O)_3SiC_3H_6Cl$ | 8.3 | 0.39 | 4.6 | 0.7 | 48 |
| 46 | $(CH_3O)_3SiCH=CH_2$ | 8.0 | 0.39 | 4.9 | 0.8 | 51 |
| 47 | $(C_2H_5O)_3SiCH=CH_2$ | 8.7 | 0.38 | 5.2 | 0.8 | 61 |
| 48 | $(CH_3O)_3SiC_2H_4$ 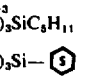 | 9.6 | 0.45 | 5.5 | 0.7 | 65 |
| 49 | $(C_2H_5O)_3SiC_3H_6NH_2$ | 9.4 | 0.39 | 5.3 | 0.8 | 71 |
| 50 | $(CH_3OC_2H_4O)_3SiCH=CH_2$ | 9.5 | 0.36 | 5.2 | 0.8 | 72 |
| 51 | $(CH_3O)_3SiC_{11}H_{22}Br$ | 10.0 | 0.41 | 5.8 | 0.8 | 80 |

*Samples did not break; calculated from scale reading.

Inspection of the above data of Table III indicates the importance of a silane coupler containing a functional group capable of reacting with a polyamide. Compositions improperly coupled because of unreactive Z groups on the coupler, Nos. 40 to 44 in the above table, are somewhat improved over a merely filled nylon but the choice of proper silane coupler, as in Nos. 48 to 51, provides at least as much additional improvement of the properly coupled compositions over the improperly coupled compositions in the important Strength Index category as is shown by the improperly coupled materials over the filled material of Example 39.

EXAMPLES 52 to 55

The following runs were carried out as described in the procedure for Examples 39 to 51 except that the type of filler was varied as indicated in Table IV below.

TABLE IV

| Composition No. | Mineral | Coupler | Flex.Str. psi × $10^{-3}$ | Flex.Mod. psi × $10^{-6}$ | Ten.Str. psi × $10^{-3}$ | Impact ft.lb./in. |
|---|---|---|---|---|---|---|
| | | | DRY | | | |
| 52 | feldspar | $(CH_3O)_3SiC_3H_6NH_2$ | 21.4 | 1.25 | 11.2 | 0.4 |
| 53 | quartz | $(CH_3O)_3SiC_3H_6NH_2$ | 20.9 | 1.12 | 10.8 | 0.4 |
| 49 | wollastonite | $(CH_3O)_3SiC_3H_6NH_2$ | 24.9 | 1.57 | 13.1 | 0.5 |
| 54 | feldspar | $(C_2H_5O)_3SiC_3H_6Cl$ | 21.7 | 1.28 | 11.7 | 0.4 |
| 55 | quartz | $(C_2H_5O)_3SiC_3H_6Cl$ | 21.6 | 1.35 | 11.8 | 0.4 |
| 45 | wollastonite | $(C_2H_5O)_3SiC_3H_6Cl$ | 20.5 | 1.51 | 11.2 | 0.3 |

| Composition No. | Mineral | Coupler | Flex.Str. psi × $10^{-3}$ | Flex.Mod. psi × $10^{-6}$ | Ten.Str. psi × $10^{-3}$ | Impact ft.lb./in. | S²I |
|---|---|---|---|---|---|---|---|
| | | | WET | | | | |
| 52 | feldpsar | $(CH_3O)_3SiC_3H_6NH_2$ | 10.5 | 0.41 | 6.5 | 0.9 | 99 |
| 53 | quartz | $(CH_3O)_3SiC_3H_6NH_2$ | 8.6 | 0.32 | 5.6 | 0.8 | 59 |
| 49 | wollastonite | $(CH_3O)_3SiC_3H_6NH_2$ | 9.4 | 0.39 | 5.3 | 0.8 | 71 |
| 54 | feldspar | $(C_2H_5O)_3SiC_3H_6Cl$ | 10.0 | 0.40 | 5.7 | 0.8 | 80 |
| 55 | quartz | $(C_2H_5O)_3SiC_3H_6Cl$ | 9.8 | 0.40 | 5.8 | 0.8 | 78 |
| 45 | wollastonite | $(C_2H_5O)_3SiC_3H_6Cl$ | 8.3 | 0.39 | 4.6 | 0.7 | 48 |

The above data of Table IV indicate the specificity of different coupler-filler adducts with polyamides and the variation in properties obtained using different couplers with different fillers in the resin. Compare for instance Compositions 52 and 53 with 49 and Compositions 54 and 55 with 45.

EXAMPLES 56 to 64

The following data reported in Table V below demonstrate that various resins perform in different manners when subjected to the action of a reinforcing filler.

The polyester compositions were prepared by mixing Paraplex P-43 (a 70/30 mix of an unsaturated polyester in styrene) with wollastonite, 0.5% by weight based on the mineral of 3-trimethoxysilylpropyl methacrylate and benzoyl peroxide catalyst in a Banbury mixer for 10 minutes. The dough-like mix was molded and polymerized for 5 minutes at 110°C and 300 p.s.i. The product was then cured for 20 hours at 110°C. The finished product contained 55% by volume (75 wt. percent) wollastonite.

The epoxy compositions were prepared by mixing 140 parts of wollastonite with 4 parts of 3-trimethoxysilylpropylamine and 50 parts of an epoxy prepolymer (Oxiron 200). To the mix was added 20 parts of a 7/1 blend of maleic anhydride/propylene glycol. The mixture was cured in a press for two hours at 85°C and subsequently post cured in an oven for 20 hours at 135°C The polycaprolactams were prepared according to the procedure followed for Example 1.

TABLE V

| Composition No. | Resin | Vol. Frac. Filler | Coupler | Flex.Str. psi × $10^{-3}$ | DRY Flex.Mod. psi × $10^{-6}$ | Impact ft.lb./in. |
|---|---|---|---|---|---|---|
| 56 | polyester | none | none | 14.1 | .55 | 0.2 |
| 57 | polyester | .57 | none | 9.6 | 2.7 | >0.1 |
| 58 | polyster | .57 | $CH_2{=}C(CH_3)C(O)O$ / $(CH_3O)_3SiH_6C_3$ | 18.8 | 4.0 | >0.1 |
| 59 | epoxy | none | none | 7.9 | .30 | — |
| 60 | epoxy | .47 | none | 8.9 | 1.8 | — |
| 61 | epoxy | .47 | $(C_2H_5O)_3SiC_3H_6NH_2$ | 10.2 | 1.8 | — |
| 62 | polycaprolactam | none | none | 12.0 | 0.3 | 0.80 |
| 63 | polycaprolactam | .49 | none | 16.0 | 1.9 | 0.50 |
| 64 | polycaprolactam | .49 | $(C_2H_5O)_3$ | 27.1 | 2.2 | 0.50 |

Inspection of the above data shows that the impact strength of filled and of reinforced polyesters is adversely affected. As a matter of fact, the impact strength is reduced virtually to zero. The flexural strength of a reinforced polyester is improved about 26% by comparison to the base resin. Granular reinforcement of an epoxy resin has little effect on the flexural properties; no impact data is available for comparison. Polyamides, on the other hand, show remarkable improvement in flexural strength, 113% over the base resin, as well as good retention of impact strength Hence, the specific nature of polymer systems has considerable effect upon its capability ot respond to granular reinforcement.

EXAMPLES 65 and 66

The procedure described for Examples 39 to 51 was used. Instead of wollastonite, a plate-like filler, mica was used at a loading of 28% by volume (52 wt. percent). The composition of Example 65 did not contain a coupler. In Example 66, 1% by weight based on the filler of 3-trimethoxysilylpropyl amine was used. Results are reported in Table VI.

TABLE VI

| npo-ion | Coupler | DRY Flex. Str. psi × $10^{-3}$ | Flex. Mod. psi × $10^{-6}$ | Tens. Str. psi × $10^{-3}$ | Impact Strength |
|---|---|---|---|---|---|
| 65 | no | 19.2 | 1.5 | 10.1 | 0.3 |
| 66 | yes | 21.5 | 1.5 | 12.1 | 0.4 |

| npo-ion | WET Flex. Str. psi × $10^{-3}$ | Flex. Mod. psi × $10^{-6}$ | Tens. Str. psi × $10^{-3}$ | Impact Strength | $S^2I$ |
|---|---|---|---|---|---|
| 65 | 5.6 | 0.4 | 3.3 | 0.7 | 22 |
| 66 | 9.2 | 0.5 | 5.6 | 0.8 | 68 |

EXAMPLE 67

A quantity of 500 parts of feldspar (average particle e 25$\mu$) was mixed with 5 parts of 11-trimethoxylylundecyl bromide and 50 parts of a nylon 6,6 moldpowder (Zytel 101). The mixture was extruded and ection molded as described above in Examples 39 to . The finished product was molded into a cylindrical ape 1.25 inches in diameter. The cylinder was ooth, hard, strong and of excellent uniform appearce. The article contained 80% by volume (91 wt. rcent) feldspar.

EXAMPLES 68 to 76

The accompanying figure shows the modulus values different filler loadings for some of the compositions this invention.

The quartz-loaded nylon 6,6 compositions were prered as described in Examples 39 to 51 using 1% 3-ethoxysilylpropyl amine on the quartz.

The wollastonite-loaded and quartz-loaded polycaplactams were prepared as described in Examples 23 38 using the sodium caprolactam catalyst. Table VII low sets forth the properties of the reinforced comsitions.

TABLE VII

| mpo-tion | Polymer | Vol. Frac. | Filler | Flex.Str. psi × $10^{-3}$ | Flex.Mod. psi × $10^{-6}$ | Impact ft.lb./in. |
|---|---|---|---|---|---|---|
| 68 | nylon 6,6 | .15 | quartz | 24.2 | 0.53 | 0.5 |
| 69 | nylon 6,6 | .20 | quartz | >16.7 | 0.41 | 0.4 |
| 70 | nylon 6,6 | .30 | quartz | >20.1 | 0.78 | 0.5 |
| 71 | nylon 6 | .42 | quartz | 23.8 | 1.50 | 0.6 |
| 72 | nylon 6 | .50 | quartz | 24.2 | 1.78 | 0.5 |
| 73 | nylon 6 | .52 | quartz | 25.2 | 1.92 | 0.5 |
| 74 | nylon 6 | .62 | quartz | — | 2.66 | 0.4 |
| 75 | nylon 6 | .15 | wollastonite | >16.0 | 0.53 | 0.5 |
| 76 | nylon 6 | .45 | wollastonite | 25.4 | 1.70 | 0.5 |

The improved properties of the reinforced polyames permit their use in many applications in which the ıreinforced polyamides are unsuitable, such as the brication of tables, chairs, drawers, and other furnire and furniture components, heavy duty equipment ›usings, automobile components and building conruction components. The reinforced filaments are eful in the manufacture of tire bodies. They can also : used as an oriented reinforcing material in other ›mpositions to improve impact resistance and rength. Further, the compositions of this invention e generally useful in those applications in which unreforced polyamides have been useful but where ineased strength, rigidity, and impact resistance are derable features.

Although the invention has been described in terms specified embodiments which are set forth in considerable detail, it should be understood that this was done for illustrative purposes only, and that the invention is not necessarily limited thereto since alternative embodiments and operating techniques will become apparent to those skilled in the art in view of this disclosure. For instance, it is possible to "fill" these compositions with a filler, i.e. with additional inorganic particulate material which is not coupler-treated as is the reinforcing agent. As an example, a mold may be loosely filled with a mixture of large (approximately 1 cm. in diameter) irregular mineral particles and sand, and a monomer-coupler-filler slurry as described in the preceding examples may be poured into the mold, thereby "wetting" the large particles in the mold and filling the spaces between the particles before polymerization occurs. In such a case, the reinforced polymer binds the sand and larger aggregates together in much the same way as cement binds sand gravel together to form a finished concrete. As an alternate method, the inorganic aggregate in the mold may be treated with a suitable coupling agent prior to the introduction of the monomer-coupler-filler slurry so that upon casting, the entire mixture is adherently bound to the polymer, thereby producing a reinforced composition wherein the reinforcing medium may exceed 90% by volume of the total composition. Similarly, glass fibers in the form of mats or woven cloth can be impregnated with the particulately reinforced compositions of this invention to produce articles having a very high inorganic content.

Accordingly, these and other modifications are contemplated which can be made without departing from the spirit of the described invention.

What is claimed is:

1. A reinforced polymeric composition comprising a polyamide and at least about 25% by volume of an inorganic filler material having a length to diameter ratio of up to about 25 to 1, said material having been treated with an organosilane coupling agent of the formula $$X_a-\overset{\overset{\displaystyle Y_b}{|}}{Si}-[R_n-Z]_c$$

where X is a hydrolyzable group capable of reaction with a hydroxyl group, Y is hydrogen or a monovalent hydrocarbon group, R is an alkylene group having from 1 to about 20 carbon atoms, Z is a group capable of reaction with a polyamide, n is an integer from 0 to 1, a is an integer from 1 to 3, b is an integer from 0 to 2, c is an integer from 1 to 3 and the sum of a+b+c equals 4.

2. A reinforced polymeric composition according to claim 1 wherein said polyamide is a polylactam.

3. A reinforced polymeric composition according to claim 1 wherein said polyamide is a polylactam whose monomeric units contained at least six carbon atoms.

4. A reinforced polymeric composition according to claim 1 wherein said polyamide is polycaprolactam.

5. A reinforced polymeric composition according to claim 1 wherein siad polyamide is a condensation product of a polyamine and polycarboxylic acid.

6. A reinforced polymeric composition according to claim 1 wherein said polyamide is polyhexamethylene adipamide.

7. A reinforced polymeric composition according to claim 1 wherein said filler comprises from about 25 to about 90% by volume of the total composition.

8. A reinforced polymeric composition according to claim 1 wherein said filler comprises from about 33 to about 67% by volume of the total composition.

9. A reinforced polymeric composition according to claim 1 wherein said filler is an inorganic siliceous material which has a 3-dimensional crystal structure, a somewhat refractory nature with a melting point above about 800°C, a Mohs' hardness of at least 4, and a water solubility of less than 0.1 gram per liter.

10. A reinforced polymeric composition according to claim 1 wherein said filler is a plate-like filler with a length to diameter ratio of less than 1 to 1.

11. A reinforced polymeric composition according to claim 1 wherein said filler has a length to diameter ratio from about 1 to 1 up to about 20 to 1.

12. A reinforced polymeric composition according to claim 1 wherein said coupling agent has the formula $$X_3—Si—R_nZ$$

where X is halogen or alkoxy, R is an alkylene group having from about 2 to about 18 carbon atoms, Z is amino, secondary amido, isocyanato, halogen, alkoxycarbonyl, epoxy, vinyl, acryloxy, or methacryloxy, and n is 0 or 1, provided that n can be zero only when Z is a vinyl group.

13. A reinforced polymeric composition according to claim 1 wherein said coupling agent is 3-trialkoxysilylpropyl amine.

14. A reinforced polymeric composition according to claim 1 wherein said coupling agent is 11-(trialkoxysilyl)-undecyl bromide.

15. A reinforced polymeric composition according to claim 1 wherein said coupling agent is tri($\beta$-methoxyethoxy)vinyl silane.

16. A reinforced polymeric composition according to claim 1 wherein said coupling agent is 3-(trialkoxysilyl)propyl chloride.

17. A reinforced polymeric composition according to claim 1 wherein said composition is characterized by a Strength Index at least triple that of an equivalently filled but uncoupled composition and a flexural modulus at least double that of the base resin.

18. A reinforced polymeric composition according to claim 1 wherein said polyamide is polycaprolactam or polyhexamethylene adipamide and wherein said composition is characterized by a Strength Index of at least $40 \times 10^6$ and a flexural modulus of at least 250,000 p.s.i.

19. A reinforced polymeric composition comprising a polyamide and from about 33 to about 67% by volume of an inorganic siliceous filler material which has a 3-dimensional crystal structure, a somewhat refractory nature with a melting point above about 800°C, a Mohs' hardness of at least 4, a water solubility of less than 0.1 gram per liter and a length to diameter ratio from about 1 to 1 up to about 20 to 1, said filler material having been treated with an organosilane coupling agent of the formula $$X_3—Si—R_nZ$$

where X is halogen or alkoxy, R is an alkylene group having from about 2 to about 18 carbon atoms, Z is amino, secondary amido, isocyanato, halogen, alkoxycarbonyl, cyclohexylepoxy, epoxy, vinyl acryloxy, or methacryloxy, and n is 0 to 1, provided that n can be zero only when Z is a vinyl group, said reinforced polymeric composition being characterized by a Strength Index at least triple that of an equivalently filled but uncoupled composition and a flexural modulus at least double that of the base resin.

20. A reinforced polymeric composition according to claim 19 wherein said polyamide is polycaprolactam or polyhexamethylene adipamide and wherein said composition is characterized by a Strength Index of at least $40 \times 10^6$ and a flexural modulus of at least 250,000.

21. A process for preparing a filler-reinforced polyamide composition having at least 25% by volume filler comprising (a) treating an inorganic filler material having a length to diameter ratio of at least 1 to 1 up to about 25 to 1 with an organosilane coupling agent of the formula $$X_a—\overset{\overset{Y_b}{|}}{Si}—[R_n—Z]_c$$

where X is a hydrolyzable group capable of reaction with a hydroxyl group, Y is hydrogen or a monovalent hydrocarbon group, R is an alkylene group having from 1 to about 20 carbon atoms, Z is a group capable of reaction with a polyamide but incapable of a reaction with a monomeric lactam which leaves the resultant silane-lactam adduct incapable of entering into a polymerization, n is an integer from 0 to 1, a is an integer from 1 to 3, b is an integer from 0 to 2, c is an integer from 1 to 3, and the sum of a+b+c equals 4 and (b) conducting a base-catalyzed, substantially anhydrous, anionic polymerization of a lactam in the presence of said filler and said coupler.

22. A process according to claim 21 wherein said filler is treated with said coupler prior to its addition to the monomer.

23. A process according to claim 21 wherein the monomer which is polymerized is $\epsilon$-caprolactam.

24. A process according to claim 21 wherein the Z group of said organosilane coupling agent is an amino group having at least one hydrogen atom, which amino group functions as a polymerization regulator.

25. A process according to claim 21 wherein said organosilane coupling agent has the formula $$(R_1O)_3Si—R—NH_2$$

where $R_1$ is an alkyl group and R is an alkylene group having from about 2 to 18 carbon atoms.

26. A process according to claim 21 wherein said organosilane coupling agent is 3-(triethoxysilyl)propyl amine.

27. A process according to claim 21 wherein the Z group of said organosilane coupling agent contains a nitrogen atom capable of functioning as a polymerization promoter.

28. A process according to claim 21 wherein said organosilane coupling agent is N-phenyl, N'-3-(triethoxysilyl)propyl urea.

29. A process according to claim 21 wherein the promoter is a polyfunctional isocyanate.

30. A process according to claim 21 wherein the catalyst is an alkylmagnesium halide.

31. A process according to claim 21 wherein the catalyst is sodium caprolactam.

32. A process according to claim 21 wherein said filler is an inorganic siliceous material having a length to diameter ratio of from about 1 to 1 up to about 25 to 1, a three-dimensional crystal structure, a somewhat refractory nature with a melting point above about 800°C, a Mohs' hardness of at least 4, and a water solubility of less than 0.1 gram per liter.

33. A process for preparing a filler-reinforced polyamide composition having at least 25% by volume filler comprising (a) adding to a monomeric lactam, an inorganic siliceous filler having a length to diameter ratio of at least up to about 25 to 1, a somewhat refractory nature with a melting point above about 800°C, a Mohs' hardness of at least 4, and a water solubility of less than 0.1 gram per liter, an organosilane coupling agent of the formula $$(R_1O)_3—Si—R—NH_2$$

where $R_1$ is an alkyl group and R is an alkylene group having from about 2 to 18 carbon atoms, and a lactam polymerization promoter, (b) removing volatile reaction products if any, (c) holding the umpolymerized mixture for an indefinite period of time.

(d) adding a lactam polymerization catalyst, (e) casing the resultant mixture into a mold, and (f) maintaining the mixture at a temperture and for a time sufficient to achieve polymerization.

34. A reinforced polyamide article comprising a polyamide and at least 25% by volume of an inorganic filler material having a length to diameter ratio of up to about 25 to 1 and a water solubility of less than 0.15 grams per liter, said material having been treated with an organosilane coupling agent of the formula $$X_a—\overset{\overset{Y_b}{|}}{Si}—[R_n—Z]_c$$

where X is a hydrolyzable group capable of reaction with a hydroxyl group, Y is hydrogen or a monovalent hydrocarbon group, R is an alkylene group having up to about 20 carbon atoms, Z is a group capable of reaction with a polyamide, n is an integer from 0 to 1, a is an integer from 1 to 3, b is an integer from 0 to 2, c is an integer from 1 to 3 and the sum of a+b+c equals 4.

35. A reinforced polyamide article according to claim 34, said article characterized by a Strength Index at least triple that of an equivalently filled but uncoupled article and a flexural modulus at least double that of an unfilled article made from the base polyamide resin.

36. A reinforced polymeric composition according to claim 17 wherein said polyamide is a polylactam.

37. A reinforced polymeric composition according to claim 17 wherein said polyamide is a condensation product of a polyamine and a polycarboxylic acid.

38. A reinforced polymeric composition according to claim 1 wherein said filler is a crystalline silica having a maximum particle size of about 5 microns and an average particle size of about 2 microns.

39. A reinforced polymeric composition according to claim 1 wherein said coupling agent has the formula $$X_3—Si—R—Z$$

where X is halogen or alkoxy, R is an alkylene group having from about 2 to 18 carbon atoms, and Z is amino, secondary amido, isocyanato, alkoxycarbonyl or epoxy.

40. A reinforced polymeric composition comprising a polyamide and from about 33 to 67% by volume of an inorganic siliceous filler material which is characterized by a 3-dimensional crystal structure, a somewhat refractory nature with a melting point above about 800°C, a Mohs' hardness of at least 4, a water solubility of less than about 0.1 gram per liter and a length to diameter ratio from about 1:1 up to about 20:1, said filler material having been treated with an organosilane coupling agent of the formula $$X_3—Si—R—Z$$

where X is halogen or alkoxy, R is an alkylene group having from about 2 to 18 carbon atoms, and Z is amino, secondary amido, isocyanato, alkoxycarbonyl or epoxy, said reinforced polymeric composition being characterized by a Strength Index at least triple that of an equivalently filled but uncoupled composition and a flexural modulus at least double that of the base resin.

*41. A reinforced polymeric composition according to claim 1 wherein said filler has a Mohs' hardness of at least 4.*

*42. A reinforced polymeric composition according to claim 41 wherein said filler has been treated with an organosilane coupling agent having the formula*

$$X_3-Si-R-Z$$

*where X is alkoxy having up to 8 carbon atoms, R is an alkylene group having from about 2 to about 18 carbon atoms and Z is amino.*

*43. A reinforced polymeric composition according to claim 42 wherein said coupling agent is 3-triethoxysilylpropyl amine.*

*44. A reinforced polymeric composition according to claim 43 wherein the polyamide is polycaprolactam.*

*45. A reinforced polymeric composition according to claim 43 wherein the polyamide is polyhexamethylene adipamide.*

* * * * *